United States Patent [19]

Hughes et al.

[11] Patent Number: 4,738,012
[45] Date of Patent: Apr. 19, 1988

[54] METHOD OF MAKING A CAM SHAFT

[76] Inventors: Robert W. Hughes, 2155 Fourteen Mile Rd., Sterling Heights, Mich. 48077; Robert H. Brisson, 28078 Alger; Glenn R. Brisson, 31632 Meadows, both of Madison Heights, Mich. 48071

[21] Appl. No.: 64,664

[22] Filed: Jun. 22, 1987

Related U.S. Application Data

[62] Division of Ser. No. 815,250, Dec. 31, 1985, Pat. No. 4,693,138.

[51] Int. Cl.⁴ ............................................. B21D 39/00
[52] U.S. Cl. .......................... 29/156.4 R; 29/421 R; 29/523
[58] Field of Search ............ 29/157.4 R, 522 R, 523, 29/156.4, 421 R; 72/58, 61, 62; 74/567; 123/90.6, 90.27, 90.31

[56] References Cited

U.S. PATENT DOCUMENTS

| | | | |
|---|---|---|---|
| 4,382,390 | 5/1983 | Jordan | 74/567 |
| 4,575,913 | 3/1986 | Sugiuchi et al. | 74/567 X |
| 4,590,655 | 5/1986 | Javorick | 72/58 X |
| 4,597,365 | 7/1986 | Madaffer | 29/156.4 R |
| 4,612,695 | 9/1986 | Uneha et al. | 29/505 |

FOREIGN PATENT DOCUMENTS

| | | | |
|---|---|---|---|
| 149655 | 9/1982 | Japan | 74/567 |
| 121354 | 7/1983 | Japan | 74/567 |
| 83731 | 5/1985 | Japan | 74/567 |
| 1117816 | 6/1968 | United Kingdom | 74/567 |

Primary Examiner—Timothy V. Eley
Attorney, Agent, or Firm—Reising, Ethington, Barnard, Perry & Milton

[57] ABSTRACT

A cam shaft made from lobes having irregularly shaped apertures spaced along the longitudinal axis of a hollow tubular shaft. The method of making the cam shaft includes the steps of: inserting a hollow tubular shaft through the apertures of a plurality of the lobes axially and radially with respect to the longitudinal axis of the shaft. The method is characterized by flaring at least a first end of the shaft and backing the exterior of the first flared end to prevent axial radial movement thereof. In addition, a plug means is inserted into fluid sealing engagement with the interior of the first flared end to sandwich the flared end against the backing of the exterior thereof. The hollow shaft is filled with liquid and the opposite ends of the shaft are clamped between the plug means at the first flared end and a fluid sealing means at the opposite end of the hollow shaft. Hydraulic force is then applied to the interior of the shaft to expand the hollow shaft into engagement with the apertures of the lobes.

11 Claims, 4 Drawing Sheets

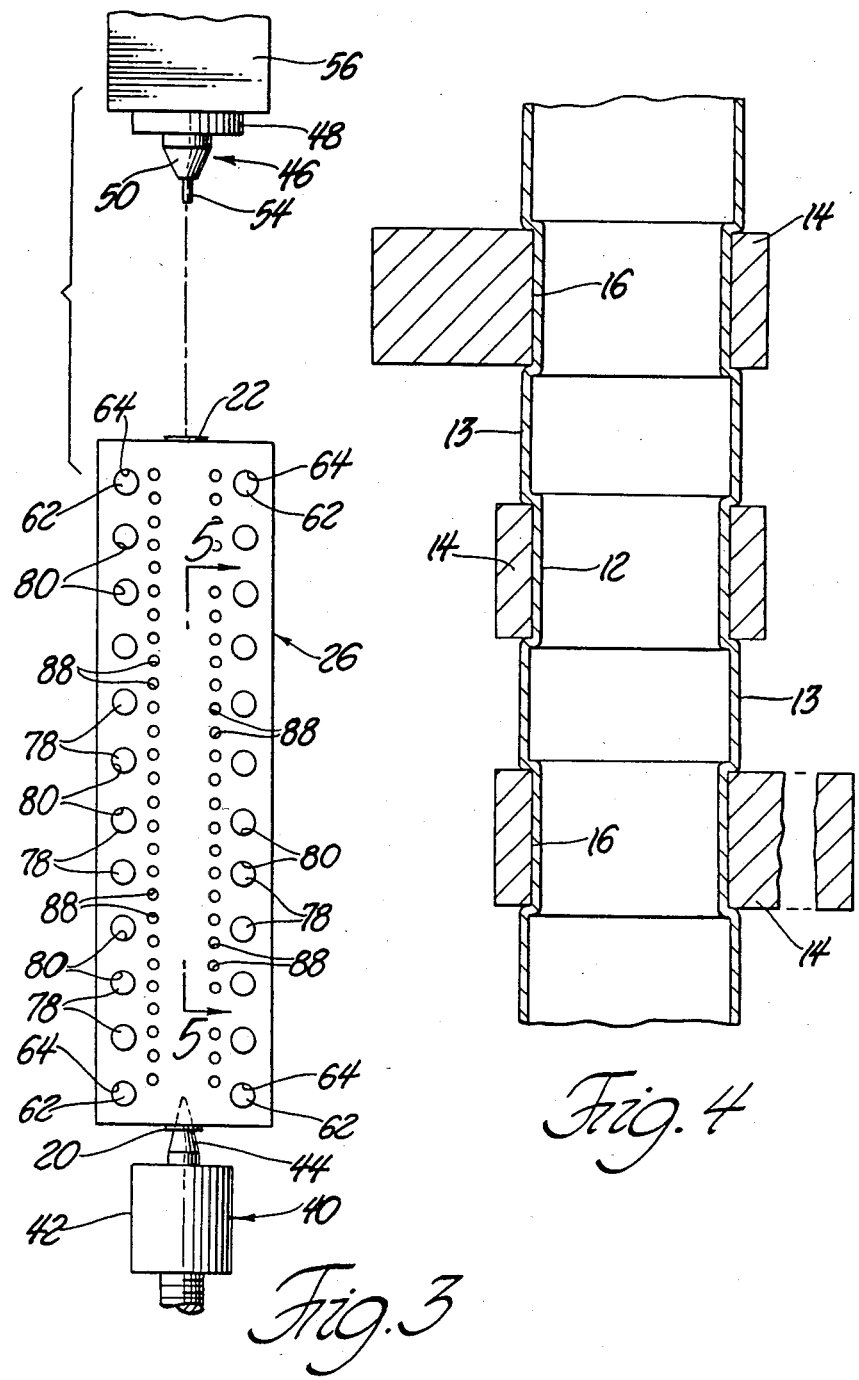

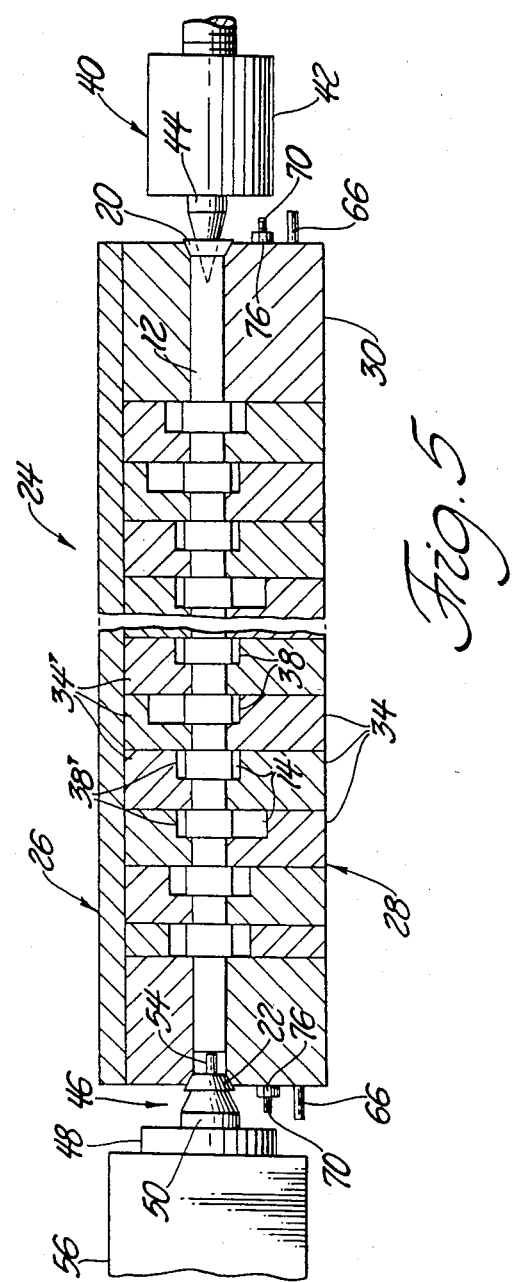

METHOD OF MAKING A CAM SHAFT

This application is a division of application Ser. No. 815,250 filed on Dec. 31, 1985 now U.S. Pat. No. 4,693,138.

BACKGROUND OF INVENTION

(1) Technical Field

The subject invention relates to a method of making a cam shaft for use in internal combustion engines in which cam lobes, bearing journals, and the like, are fixedly attached to a hollow tubular shaft resulting in a lightweight, strong, low cost cam shaft.

(2) Description of the Prior Art

Early in the history of the internal combustion engine, cam shafts were cast from iron in molds and then underwent numerous finishing processes until the cam lobes and the shafts were in precise orientation with respect to each other which facilitated precision valve control on the engines. Many improvements in the field have been realized since then and have resulted in the present state of the art.

Methods of making cam shafts for internal combustion engines which employ means for attaching lobes, bearing journals, and the like, to hollow tubular shafts are not unknown in the prior art. For example, U.S. Pat. No. 4,293,995 granted Oct. 15, 1981 to Jordan discloses a method of making a cam shaft for reciprocal piston engines whereby cams having irregularly shaped apertures are arranged on a hollow shaft and secured in a die. The hollow shaft is then widened by means of a rubber rod which substantially corresponds to the inner diameter of the hollow shaft. The rubber rod is compressed from both ends to cause the body of the rod to expand. The hollow tubular shaft is widened to such an extent that the outside wall of the shaft surrounded by the cam reaches into the irregular inner form of the cam producing a tight, secure, fit. In addition, the patent also discloses use of hydraulic or electrohydraulic expansion of the shaft.

The expired U.S. Pat. No. 2,892,254 granted on June 30, 1959 to Garvin discloses a method of making a cam shaft wherein the cam lobes are formed from the tubular shaft by the application of internal pressure to the tubular shaft while the shaft is contained in a die having cavities conforming to the shape of the lobes. The cam lobes are formed one at a time in sequence in the die by the application of hydraulic pressure within the tubular shaft such that the shaft expands into the cavities of the die thereby forming the cam lobes.

Inherent with methods of making cam shafts for internal combustion engines from tubular shafts are the associated problems with expensive and elaborate piston cylinder arrangements utilized to create sufficient hydraulic pressure within the tubular shaft to expand the shaft outwardly. Employing high internal pressures also requires the use of expensive dies and, in addition, sealing problems often arise.

Another method has been to drive a ball or mandrel of larger diameter than the interior diameter of the tubular shaft to expand the same into engagement with the interior apertures in the lobes. This method requires close tolerances in the lobes, tube thickness and mandrel or ball.

The present invention overcomes all the aforementioned problems while facilitating the production of a relatively low cost, high quality cam shaft which is also very strong and durable. Significantly, the lobes of the cam shaft may be made of different materials from each other and from the shaft itself.

SUMMARY OF INVENTION

The subject invention is related to a method of making a cam shaft from lobes having irregularly shaped apertures spaced along the longitudinal axis of a hollow tubular shaft. This method includes the steps of inserting a hollow tubular shaft through the apertures of a plurality of the lobes and orientating each of the lobes axially and radially with respect to the longitudinal axis of the shaft. The method also includes flaring at least one end of the shaft, backing the exterior of the first flared end to prevent axial and radial movement thereof, inserting a plug means into fluid sealing engagement with the interior of the flared end, filling the hollow shaft with a fluid and clamping the opposite ends of the shaft between the plug means at the first flared end and a fluid sealing means at the opposite end of the hollow shaft. Hydraulic forces are then applied to the liquid to expand the hollow shaft into irregular contact with the interior of the apertures.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a top view of the fully assembled apparatus enclosing a hollow tubular shaft and lobes;

FIG. 4 is a partially broken away cross section of a completed cam shaft;

FIG. 5 is a cross section of the assembled apparatus with plug and sealing means engaging the opposite ends of the hollow tubular shaft and the ram rod shown extended in phantom.

DESCRIPTION OF THE PREFERRED EMBODIMENT

Figure 1:
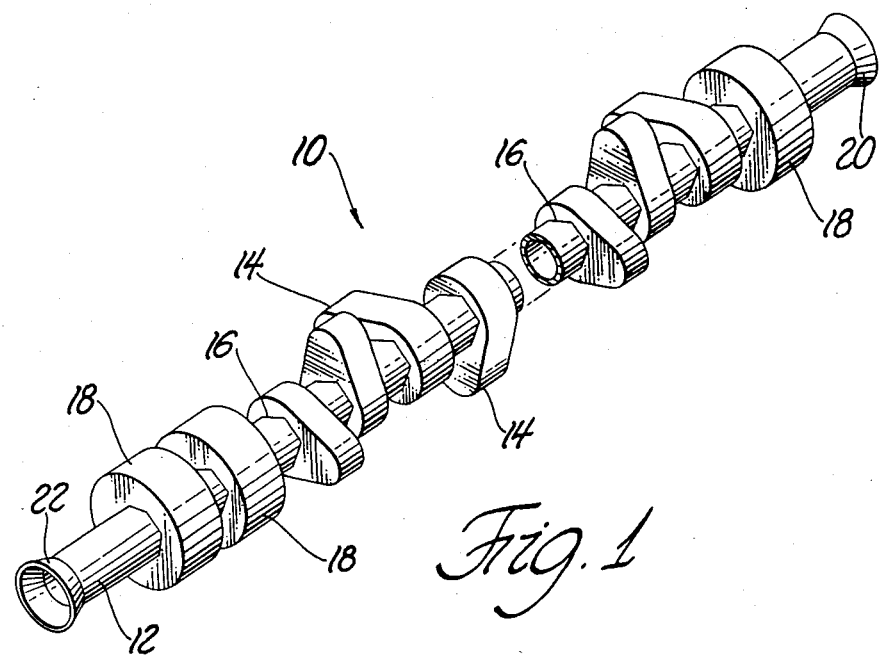
FIG. 1 is a perspective view of a cam shaft manufactured by the subject method.

A cam shaft produced by the subject method is generally shown at 10 in FIG. 1. The cam shaft includes a hollow tubular shaft 12 with lobes 14 having irregularly shaped apertures 16 spaced along the longitudinal axis of the hollow tubular shaft 12. The lobes 14 are orientated axially and radially with respect to the longitudinal axis of the shaft 12 in predetermined positions along the axis of the shaft 12. The exterior surfaces of the lobes 14 are positioned radially relative to the longitudinal axis of the shaft 12 with the radial positions of the interior apertures being offset among adjacent lobes 14. Said another way, adjacent lobes 14 are positioned radially relative to the longitudinal axis of the shaft 12 only and not relative to each other. The shaft 12 also includes bearing journals 18, or the like, for balancing and stabilizing the cam shaft 12. The cam shaft 12 as shown in FIG. 1, includes first and second flared ends 20, 22 which facilitate the sealing of the hollow tubular shaft 12 while the various steps of the method are performed. In addtion, the lobes 14 of the cam shaft 10 may be made of different materials from the shaft 12 itself. Further, the lobes 14 may be made from materials which are different from one another.

Figure 2:
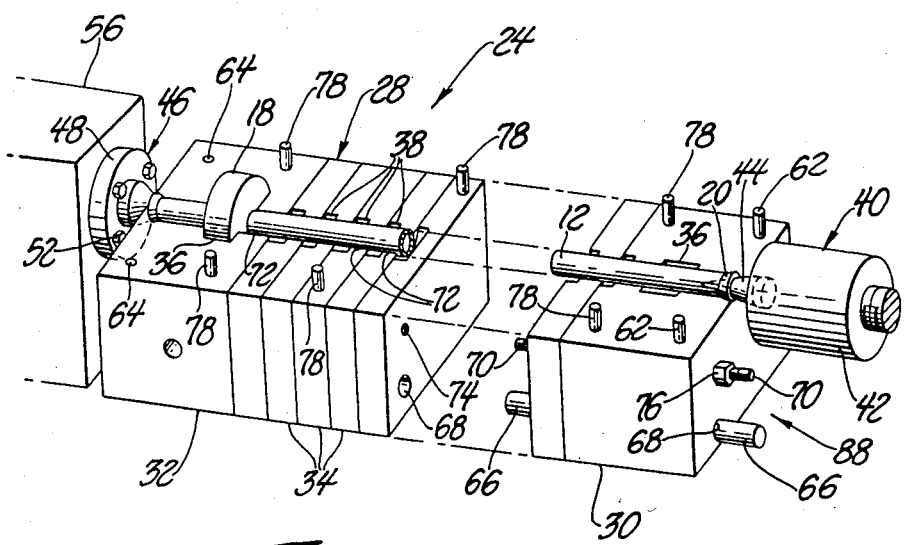
FIG. 2 is a perspective view of a preferred embodiment of an apparatus of the subject invention.

Turning now to FIG. 2, there is shown one-half 28 of the apparatus 24 which includes an upper half 26 and a lower half 28. The lower half 28 includes two ends plates 30 and 32 between which are sandwiched a plurality of individual plates 34. The end plates or blocks 30 and 32 are rectangular in shape and add stability to the apparatus 24. The end plates 30 and 32 include recesses 36 for receiving and securely holding bearing journals 18, or the like, while the subject method is performed. The plates 34 are also rectangular in shape but not as longitudinally thick as the end plates 30 and 32. A plurality of the cam plates 34 include lower cam orientating means 38 which are semi-circular lobe recesses for receiving and positioning the lobes 14 and which radially orientate the cam lobes 14 with respect to the shaft 12. Each plate 30, 32 and 34 also includes a tube recess 72 axially adjacent each cam orientating means 38 in plates 34 as well as the recesses 36 in the end plates 30 and 32 and for disposition in radially spaced relationship to the exterior of the tube 12 to limit radial expansion thereof. Any cam plate 34 may be interchanged or substituted with any other cam plate. In addition, any cam plate 34 may be deleted from the lower half 28. This feature provides infinite flexibility for manufacturing cam shafts 10 for a large range of internal combustion engines within which the number of valves may differ greatly. A positioning means 86 is employed for precisely positioning the recesses 36 and 38 relative to an axis and one another to precisely position the exterior surfaces of the lobes 14. The positioning means 86 includes guide pins 66 which extend parallel to the longitudinal axis of the apparatus 24 through precision bored guide holes 68 in each cam plate 34 as well as in each end plate 30 and 32 to precisely position each plate. The guide holes 68 are disposed concentrically with respect to one another and in precise relationship with the cam orientating means 38 in each plate 34 as well as the recesses 36 such that each plate 30, 32 and 34 may be aligned precisely with respect to one another. Threaded end bolts 70 also extend parallel to the longitudinal axis of the apparatus 24 through bolt holes 74 in each plate 30 and 34. A nut 76, or the like, is threadedly disposed upon the end bolts 70 and securely holds the plates 30, 32 and 34 together.

When the apparatus 24 is assembled, the upper and lower halves 26 and 28 of the apparatus 24 mate to define an enclosure in which the shaft 12, cam lobes 14 as well as bearing journals 18, or the like, are securely held by fastening means 78 for clamping each half 26 and 28 in mating engagement with each one another while the steps of the subject method are preformed.

Also depicted in FIG. 2 is a plug means 40 which includes a body 42 with a conical plug 44 for both flaring and sealing the first end 20 of the hollow tubular shaft. A fluid sealing means 46 is disposed at the second or upper end 22 of the tubular shaft. The fluid sealing means 46 includes a circular disc base 48 and a frustoconical sealing member 50 fastened to the base 48 by machine screws 52, or the like. The frustoconical sealing member 50 includes an extendible ram rod 54 of smaller diameter than the inner diameter of the hollow tubular shaft 12. The rod 54 is extendible from the flat outer face of the frustoconical sealing member 50 immediately into the interior of the hollow tubular shaft 12. The fluid sealing means 46 is also employed to flare the second end 22 of the hollow tubular shaft 12 which facilitates a tighter, more efficient seal. The fluid sealing means 46 is fixedly secured to a housing member 56 which provides support for the sealing means 46 and within which is housed a piston cylinder arrangement for actuating the ram rod 54.

FIG. 3 is a top view of the assembled apparatus 24 enclosing the hollow tubular shaft and lobes. The upper half 26 of the apparatus 24 is shown and includes a plurality of alignment pins 62 disposed perpendicular to the longitudinal axis of the apparatus 24 and extending through alignment holes 64 in plates 30 and 32 in both of the upper and lower halves 26 and 28 of the apparatus 24. The alignment pins serve to precisely align the upper and lower halves 26 and 28 with respect to each other. In addition, fastening means 78 are disposed along both of the longer sides of the apparatus 24 and extend through holes 80 in the plates 30, 32 and 34 in both the upper and lower halves 26 and 28 of the apparatus 24. This view also depicts the plug means 40 and fluid sealing means 46 disposed at the opposite ends 20 and 22 respectively of the hollow tubular shaft 12. Also shown in this view is the upper half or body portion 26 of the apparatus 24.

Figure 6:
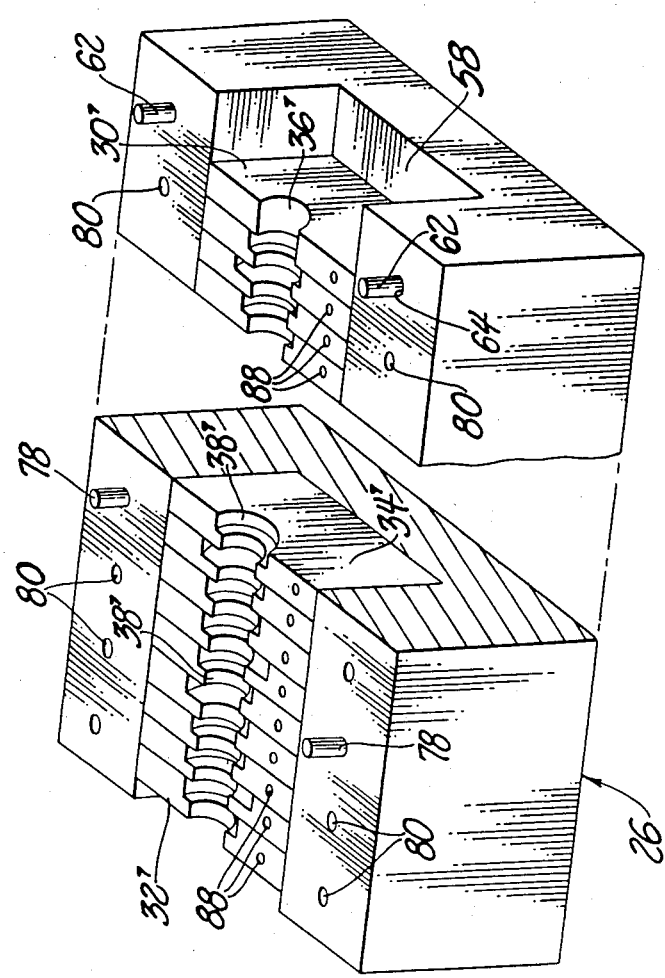
FIG. 6 is a perspective view of an alternative embodiment of one half of the apparatus in the upside down position.

Another embodiment of the apparatus 24 is shown in FIG. 6. The upper and lower halves 26 and 28 of the apparatus 24 may each be integral substantially rectangular channel members with a central cavity or trough 58 extending centrally along the longitudinal axis of the two halves 26 and 28. The channel 28 includes and supports end plates 30' and 32'. The end plates include recesses 36' for receiving and securely holding bearing journals 18, or the like. Each half 26 and 28 also includes a plurality of cam plates 34' and which mate with each other to radially orientate the cam lobes 14 with respect to the shaft 12 and to constrain the shaft 12 and cam lobes 14 during the performing of the steps of the method. The cam plates 34' are rectangular in shape and fixedly secured within the central cavity 58 by any conventional fasteners 88 such asa machine screws, or the like. The cam plates 34' include recesses 38' which engage the lobes 14 to orientate and restrain them. A plurality of alignment pins 62 are disposed perpendicular to the longitudinal axis of the apparatus 24 and extend through alignment holes 64 in both the upper and lower halves 26 and 28 of the apparatus 24. The alignment pins serve to precisely align the upper and lower halves 26 and 28 with respect to one another. In addition, fastening means 78 are disposed along both of the longer sies of the apparatus 24 and extend through holes 80 in each half 26 and 28 of the apparatus 24. It is to be understood that the apparatus 24 may include the use of a channel member or one half in conjunction with plates or the other half. In other words, each half 26 and 28 of the apparatus 24 may consist of both channel member, both plates or a channel member and plates.

FIG. 4 is a broken away and cross sectional view of a completed cam shaft 10. This figure shows the cam lobes 14 radially and axially orientated and affixed to the shaft 12. The shaft 12 is shown expanded outwardly to engage the irregular shaped apertures 16 of the lobes 14 as well as expanded radially outwardly farther in the portions 13 in between the lobes 14 thereby fixedly securing the lobes axially as well as radially. In other words, the radial expansion of the tube is restrained along the positions between adjacent lobes at a radial extent greater than the radial extent of the apertures in adjacent likes to define shoulders in the exterior of the tube adjacent each lobe to prevent axial movement of the lobes along the tube.

FIG. 5 is a cross-sectional view of the apparatus 24 in its assembled state constraining the shaft 12 and lobes 14 and depicting the engagement of the plug means 40 and fluid sealing means 46 with first and second ends 20 and 22 of the shaft. This figure depicts the use of a channel member as an upper half 26 and plates or a lower half 28. In addition, the ram rod 54 is shown extended from the flat outer face of the frustoconical sealing member 50 into the liquid filled hollow tubular shaft 12.

Turning now to the subject method of making a cam shaft 10 from lobes 14 having irregularly shaped apertures 16 spaced along the longitudinal axis of a hollow tubular shaft 12 and also having exterior circumferences of the lobes finished to closer tolerances than the interior apertures; a method comprises the steps of: inserting a hollow tubular shaft 12 through the apertures 16 of a plurality of the lobes 14 and placing the shaft 12 and lobes 14 in the lower body portion 26 of the apparatus 24. The lobes 14 are then orientated axially and radially with respect to the longitudinal axis of the shaft 12 and without reference to the position of the interior apertures by selectively placing them into lower cam orientating means 38. The lobes are placed on the respective receiving recesses 38 and are precisely positioned by the high tolerance exterior surfaces of the lobes engaging the high tolerance surfaces of the receiving recesses 38. Thereafter, the shaft may be inserted through the apertures in the lobes. It will thus be appreciated why the apertures of the lobes have less precision or greater tolerances than the exterior surfaces of the lobes. The upper half 26 of the apparatus 24 is then secured to the end plates 34 and 32 as well as to a plurality of the cam plates 34 by tightening the fastening means 78 in the holes 80. The upper half 26 provides further orientation of the lobes 14 as well as constraining the lobes 14 and the shaft 12 and also providing sealing engagement with the lower body portion 28. At least one end of the shaft 20 is flared but both ends 20 and 22 may be flared simultaneously by forcibly engaging the ends 20 and 22 with the plug means 40 and the fluid sealing means 46 respectively. The ends 20 and 22 are flared into backing engagement with the apparatus 24 to prevent axial and radial movement thereof and to provide sealing surfaces for sealing engagement with the plug means 40 and the sealing means 46. The plug means 40 is then moved into sealing engagement with the interior of the first flared end 20 and the apparatus is rotated upwardly to a substantially vertical position. The hollow shaft 12 is filled with liquid and the fluid sealing means 46 is moved into sealing engagement with the interior of the second flared end 22 of the hollow tubular shaft 12 thereby clamping the shaft 12 between the plug means 40 at the first flared end 20 and the fluid sealing means 46 at the second flared end 22. The ram rod 54 of smaller diameter than the interior of the hollow shaft 12 and positioned within the fluid sealing means 46 is advanced or forced into the hollow interior of the shaft 12 thereby applying hydraulic force to expand the hollow shaft 12 into engagement with the interior of the apertures 16 of the lobes 14 as well as expanding the shaft 12 outwardly in between the lobes 14 and thereby fixedly securing the lobes 14 axially as well as radially. Upon the expansion of the shaft 12 into the above-mentioned engagement, the plug means 40 is disengaged to break the seal and then the ram rod 54 is retracted. The fluid sealing means 46 is disengaged and the cam shaft 10 removed from the apparatus. The flared ends 20 and 22 are then removed from the cam shaft 12, e.g., the flared ends are cut off as by a saw.

The result of this method is a relatively low cost, high quality cam shaft which is very strong and durable. In addition, the method affords infinite flexibility for producing various cam shafts for use in a wide range of internal combustion engines which may employ a different number of valves for any given piston cylinder arrangement as well as different valve timing and valve overlap.

The invention has been described in a illustrative manner and it is to be understood that the terminology which has been used is intended to be in the nature of words of description rather than limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What I claim is as follows:

1. A method of making a cam shaft (10) from lobes (14) having irregularly shaped apertures spaced along the longitudinal axis of a hollow tubular shaft (12), said method comprising the steps of:

inserting a hollow tubular shaft (12) through the apertures of a plurality of the lobes (14);

orientating each of the lobes (14) axially and radially with respect to the longitudinal axis of the shaft (12);

said method characterized by flaring at least a first end (20) of the shaft (12);

backing the exterior of the first flared end (20) to prevent axial and radial movement thereof;

inserting a plug means (40) into fluid sealing engagement with the interior of the first flared end (20) to sandwich the flared end (20) against the backing of the exterior thereof;

filling the hollow shaft (12) with liquid;

clamping the opposite ends (20, 22) of the shaft (12) between the plug means (40) at the first flared end (20) and a fluid sealing means (46) at the opposite end of the hollow shaft (12);

and applying hydraulic force to the interior of the shaft (12) to expand the hollow shaft (12) into engagement with the apertures of the lobes (14).

2. A method as set forth in claim 1 further characterized by positioning the hollow shaft (12) in an upwardly extending position from the flared end (20) disposed in engagement with the plug means (40), and filling the hollow shaft (12) from the opposite and upper end (22) of the hollow shaft (12).

3. A method as set forth in claim 2 further characterized by forcing a ram rod (54) of smaller diameter than the interior of the hollow shaft (12) into the liquid within the hollow shaft (12) thereby radially expanding the tube by applying hydraulic force to the liquid.

4. A method as set forth in claim 3 further characterized by flaring the opposite second end (22) of the shaft (12) and backing the exterior of the second flared end (22), and inserting the fluid sealing means (46) into sealing engagement with the interior of the second flared end (22).

5. A method as set forth in claim 4 further characterized by inserting the fluid sealing means (46) into sealing engagement within the second flared end (22) after the hollow shaft (12) is full of liquid.

6. A method as set forth in claim 5 further characterized by positioning the ram rod (54) within the sealing means (46) and advancing the ram rod (54) into the hollow interior of the shaft (12).

7. A method as set forth in claim 6 further characterized by disengaging plug means (40) to break the seal, retracting the ram rod (54) and then disengaging the fluid sealing means (46).

8. A method as set forth in claim 7 further characterized by releasing the shaft (12) from the apparatus and removing the flared ends (20, 22) from the shaft (12).

9. A method as set forth in any one of claims 1, 3, or 7 further characterized by expanding the hollow shaft (12) into irregular engagement with the interior of the apertures of the lobes (14) and expanding the interior of the shaft (12) to a greater extent adjacent the lobes (14) to prevent axial movement of the lobes (14) along the shaft (12).

10. A method as set forth in any one of claims 1, 3 or 7 fruther characterized by restraining the radial expansion of the shaft (12) along the portions between adjacent lobes (14) at a radial extent greater than the radial extent of the apertures in the adjacent lobes (14) to define shoulders in the exterior of the shaft (12) adjacent each lobe (14) to prevent axial movement of the lobes (14) along the tube.

11. A method as set forth in claim 6 further characterized by finishing the exterior circumferences of the lobes (14) to closer tolerances than the interior apertures and radially positioning the exterior surfaces of the lobes (14) relative to the longitudinal axis of the shaft without reference to the position of the interior apertures.

* * * * *